United States Patent
Griffith et al.

(10) Patent No.: US 8,101,240 B2
(45) Date of Patent: Jan. 24, 2012

(54) RELEASE COATING AND PROCESS

(75) Inventors: William B. Griffith, North Wales, PA (US); Nader Nassif Kamel, Doylestown, PA (US); Don Gordon Pierson, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 909 days.

(21) Appl. No.: 11/810,639

(22) Filed: Jun. 6, 2007

(65) Prior Publication Data

US 2007/0281035 A1      Dec. 6, 2007

Related U.S. Application Data

(60) Provisional application No. 60/811,303, filed on Jun. 6, 2006.

(51) Int. Cl.
    *B05D 3/02* (2006.01)
(52) U.S. Cl. .................. 427/385.5; 427/384; 428/355 R
(58) Field of Classification Search .................. None
    See application file for complete search history.

(56) References Cited

U.S. PATENT DOCUMENTS

| | | | | |
|---|---|---|---|---|
| 3,933,702 A | * | 1/1976 | Caimi et al. | 524/44 |
| 4,699,966 A | | 10/1987 | Harris et al. | |
| 4,791,151 A | | 12/1988 | Kowalski et al. | |
| 5,030,666 A | * | 7/1991 | Kowalski et al. | 523/201 |
| 5,521,266 A | | 5/1996 | Lau | |
| 5,621,030 A | | 4/1997 | Shipston et al. | |
| 6,184,300 B1 | | 2/2001 | Shimokawa | |
| 6,391,957 B1 | * | 5/2002 | Kanemoto et al. | 524/376 |
| 6,455,153 B1 | * | 9/2002 | Lonc et al. | 428/352 |
| 6,849,340 B1 | * | 2/2005 | Dhaler et al. | 428/447 |
| 2004/0247783 A1 | * | 12/2004 | Rosano | 427/180 |

FOREIGN PATENT DOCUMENTS

| | | |
|---|---|---|
| EP | 1 394 209 A1 | 3/2004 |
| JP | 1988/197544 | 8/1988 |
| JP | 1989/007837 | 2/1989 |
| WO | WO 89/08092 | 2/1989 |

* cited by examiner

Primary Examiner — Dah-Wei Yuan
Assistant Examiner — Robert S Walters, Jr.
(74) Attorney, Agent, or Firm — Tifani M. Cottingham

(57) ABSTRACT

A release coating having improved stability under aging conditions of heat and humidity is described whose release force can be altered by varying the amount of multi-lobe emulsion polymers relative to release agent.

10 Claims, No Drawings

RELEASE COATING AND PROCESS

CROSS-REFERENCE TO RELATED APPLICATIONS

This application claims the benefit of priority under 35 U.S.C. §119(e) of U.S. Provisional Patent Application No. 60/811,303 filed on Jun. 6, 2006

This invention relates to release coatings and adhesives. In particular, the invention is directed to multi-lobe aqueous emulsion polymers as release coatings for adhesives. The invention further relates to multi-lobe aqueous emulsion polymer release coatings that are resistant to heat, humidity, aging, and have desirable rheology and hold out for controlling coating weight and adjustable unwind release force. Additionally, the invention is further directed to a process for altering the release force of the release coating.

Adhesive tapes are typically wound into a roll on their own backing (also referred to as self-wound tapes). The backing of self wound tapes is designed to function as the release coating, while labels and sheets are typically laminated to a release sheet or coating in alternating layers of adhesive and release coating to prevent their accidental adhesion with the other surface of the label and corresponding sheet. The release coating is designed so that it possesses a sufficiently low adhesion force, relative to the adhesive coated article, to allow the adhesive coated article to unwind or release from the release coating. If the adhesive force of the release coating is not sufficiently low relative to the adhesive coated article, the adhesive coated article will have problems unwinding and releasing from the release coating.

Moreover, it often necessary to adjust the rheology of the release coating to have acceptable coatability and/or to minimize the amount of material that soaks into porous substrates such as paper. In such cases, thickeners are added to the release coat to achieve a desirable Theological profile. Consistent coat weight and unwind stability are desired effects of adding thickeners to achieve a desirable Theological profile, but the addition of a thickener can also increase the water sensitivity of a release coat which is undesirable. Furthermore, some thickeners can increase the extensional rheology of a system, thereby resulting in poorer coatabilty.

Release coatings seeking to solve these problems are disclosed in U.S. Pat. No. 5,621,030. U.S. Pat. No. 5,621,030 discloses a release coating comprising about 10 to about 80 parts by wet weight of a sulfosuccinamate surfactant; and about 20 to about 90 parts by wet weight of an acrylic copolymer. Although this patent attempts to solve the aforementioned problems, the desired water sensitivity and optimal coatability is still not achieved since adjusting solids and thickener levels by conventional means has detrimental effects on the coating quality.

Thus, it is desirable to provide alternative release coatings for adhesive articles that do not require such high level of thickeners.

The present invention solves this problem by providing aqueous release coatings that are prepared from multi-lobe emulsion polymers which can provide uniform release characteristics and wide ranges of release levels for both permanent and repositionable adhesives, including but not limited to pressure sensitive aqdhesives (PSAs) with the level of release determined by the amount of release agents relative to the multi-lobe emulsion polymers in applications where release coats are required.

Furthermore, the present invention provides an aqueous release coating wherein its release force can be altered relative to the adhesive force of the adhesive article. Other important characteristics of the aqueous release coating of the present invention are improved aging after exposure to heat and humidity relative to conventional release coatings like RHOPLEX® R-308, R-225 and R-253 (commercially obtainable from Rohm and Haas Company). With this invention, a stable release performance and minimal loss in re-adhesion values are desired, without requiring post-coating cross-linking reactions; and acceptable release performance on coating and drying without requiring organic solvents or co-solvents. Stability to heat and humidity is measured by quantifying the percent increase in release force, as compared to initial results prior to aging. Accordingly, the present invention provides a release coating comprising: (a) at least one aqueous multi-lobe emulsion polymer; and (b) at least one release agent. The present invention also provides a coated substrate formed by coating a mixture of the at least one aqueous multi-lobe emulsion polymer and the at least one release agent onto a substrate and allowing it to dry.

The present invention also provides a method of altering the release force of a release coating comprising the steps of: (a) providing at least one aqueous multi-lobe emulsion polymer and at least one release agent; and (b) varying the Tg of the at least one aqueous polymer comprised of a multi-lobed polymer.

The aqueous release coating of the present invention is prepared from multi-lobe emulsion polymers that provide desired rheological behaviors and surface properties, like film formation and hold out when coated onto a substrate. These results are achievable by application of at least single layers of thermoplastic polymer, blends of polymers or filled polymers or include multiple layers thereof. Also, the aqueous release coating of the present invention provides desired physical film properties including tear, elongation, and tensile properties.

DETAILED DESCRIPTION OF THE INVENTION

In one aspect of the present invention, aqueous, multi-lobe polymers with the appropriate amounts of release agent are surprisingly effective at providing desired unwind or release force, before and after aging, even at low solid contents. Here, the release force can be adjusted depending on the adhesive force of the adhesive article to which they are contacted. This release coating is useful as a release coating for adhesives, including but not limited to for example, rubber based, hot melt, reactive hot melt, and acrylic based adhesives.

The importance of release level in PSAs for example, is described by D. Satas, Chapt. 23 "Release Coatings", Handbook of Pressure Sensitive Adhesive Technology, Second Edition, D. Satas, ed., Van Nostrand Reinhold, 1989, that defines seven distinct levels of release, ranging from "super low release" (0.15-0.30 N/dm) to "very tight release" (20-80 N/dm).

The release coatings of the present invention possess other properties besides functioning as a release coating. Additionally, solvent resistance and adhesion are important properties of the release coating of the present invention.

As used herein, the term "multi-lobe" refers to non-spherical emulsion polymer particle morphology. Suitable multi-lobe emulsion polymers used in accordance with the present invention are described in U.S. Pat. No. 4,791,151.

As used herein, the term lower solids, refers to multi-lobe formulations with a solid content in the range of 15-45% solids.

As used herein, the term "dispersion" refers to a physical state of matter that includes at least two distinct phases, wherein a first phase is distributed in a second phase, with the second phase being a continuous medium. Polymer dispersion is a dispersion containing a first phase distributed in an aqueous second phase that is predominately water and may contain minor amounts of water soluble or water-miscible liquids, such as lower alkyl alcohols, ketones, or glycols.

Unless otherwise specified, the term particle size as used herein refers to the weight average particle diameter as determined using a capillary hydrodynamic fractionation apparatus, such as the Matec CHDF-2000 apparatus (Matec Applied Sciences, MA) with ultraviolet detection at 200 nm. Particle size standards are provided by National Institute of Standards and Technology (NIST) traceable polystyrene standards of 50 to 800 nm, such as supplied by Duke Scientific Corporation, CA.

The term "$Tg,\infty$" as used herein refers to the glass transition temperature of high molecular weight polymers, as determined by weight average molecular weight. High molecular weight being Mw 50,000 or greater, as determined using the Fox equation (T.G. Fox, Bull. Am. Physics Soc., Volume 1, Issue No. 3, page 123(1956)). That is, for calculating the $Tg,\infty$ of a copolymer of monomers M1 and M2, $$1/Tg,\infty = w(M1)/Tg(M1) + w(M2)/Tg(M2), \text{ wherein}$$

$Tg,\infty$ is the glass transition temperature calculated for the copolymer;
w(M1) is the weight fraction of monomer M1 in the copolymer;
w(M2) is the weight fraction of monomer M2 in the copolymer;
Tg(M1) is the glass transition temperature of the high molecular weight homopolymer of M1;
and Tg(M2) is the glass transition temperature of the high molecular weight homopolymer of M2; where all temperatures are in degrees Kelvin (° K.).

The glass transition temperatures of homopolymers are those in "Polymer Handbook," 4$^{th}$ edition edited by J. Brandrup, E. H. Immergut, and E. A. Grulke, Wiley-Interscience Publishers (1999). If more than one glass transition temperature is reported, the average of the reported values is used.

By "measured Tg," as used herein, is meant the glass transition temperature as determined by differential scanning calorimetry (DSC) using a heating rate of 10° C./minute, taking the mid-point in the heat flow versus temperature transition as the Tg value.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylic acid" refers to either acrylic acid or methacrylic acid; and the term "(meth)acrylamide" refers to either acrylamide or methacrylamide.

Emulsion polymers of the present invention are formed by the polymerization of one or more ethylenically unsaturated monomers and may be polymerized by any means known in the art including solution, emulsion, mini-emulsion, microemulsion, or suspension polymerization processes. The practice of emulsion polymerization is discussed in detail in D. C. Blackley, Emulsion Polymerization (Wiley, 1975) and H. Warson, The Applications of Synthetic Resin Emulsions, Chapter 2 (Ernest Benn Ltd., London 1972).

In aspects of the invention utilizing emulsion or mini-emulsion polymerization processes, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant may vary in ranges from lower limits of 0.1, 0.25, 0.4% to upper limits of 6, 3, 0.7% based on the weight of monomer. All of the surfactant ranges are inclusive and combinable.

Either thermal or redox initiation processes can be used during the synthesis preparations of the multi-lobe polymers. The reaction temperature is typically maintained at a temperature lower than 100° C. throughout the course of the reaction. The reaction temperature can vary without limitation in ranges from lower limits of 15° C., 60° C., and 75° C. to upper limits of 125° C., 90° C. and 85° C. All of the reaction temperature ranges are inclusive and combinable. When forming polymers of the invention by polymerization of ethylenically unsaturated monomers conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators (alternatively referred to as "oxidants" herein) coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Ethylenically unsaturated nonionic monomers useful to the invention include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, styrene, substituted styrenes, ethylene, butadiene; vinyl acetate, vinyl butyrate and other vinyl esters; vinyl monomers such as vinyl chloride, vinyl toluene, and vinyl benzophenone; and vinylidene chloride.

Ethylenically unsaturated acid monomers useful to the invention include, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

In some aspects of the invention polymers formed by the polymerization of ethylenically unsaturated monomers may contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

In some aspects of the invention it may be desirable to incorporate into one or more of the polymeric components functional monomers which impart specialized performance to the aqueous dispersion. Ethylenically unsaturated monomers bearing such functional groups include vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2, 2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth)acryloxyethyldimethyl-β-propiobetaine, diethanolamine monovinyl ether, (meth)acryloxyacetamido-ethylethyleneurea, ethyleneureidoethyl (meth)acrylate, (meth)acrylamidoethyl-ethyleneurea, acylamidoalkyl vinyl alkyleneureas, aldehyde-reactive amino group-containing monomers as dimethylaminoethyl methacrylate, and ethylenically unsaturated monomers containing aziridine functionality.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the polymers formed by the polymerization of ethylenically unsaturated monomers and/or to provide a different molecular weight distribution than would otherwise have been obtained with any free-radical-generating initiator(s).

In one aspect of the present invention, the release coating comprises a blend of polymers of differing particle size distributions without limitation, in the range from lower limits of 50 nm, 75 nm, and 100 nm to upper limits of 10,000 nm, 5,000 nm, and 1,000 nm as measured by Capillary Hydrodynamic Fractionation (CHDF). All particle size distributions are inclusive and combinable. This blend is hereinafter referred to as a multimodal particle size distribution. The means of forming a multimodal particle size distribution in an emulsion polymerization process are well known by those having skill in the art. The formation of multimodal particle size distributions comprising two or more polymers having multiple size modes may be accomplished by adding seed polymers, surfactant, mini-emulsion, or pH adjusting agents such as buffers, to one of the polymers. In the case of addition of mini-emulsion, monomers can be added prior to or during the addition of the mini-emulsion.

In another aspect of the present invention the release coating may comprise blends particles having different morphologies. These blends may comprise uni-lobe and multi-lobe particles.

In some aspects of the invention, it is desirable to form emulsion polymers by free radical aqueous polymerization in the presence of a macromolecular organic compound having a hydrophobic cavity, as disclosed in U.S. Pat. No. 5,521,266. The macromolecular organic compound having a hydrophobic cavity useful in the method of the invention include cyclodextrin and cyclodextrin derivatives; cyclic oligosaccharides having a hydrophobic cavity such as cycloinulohexose, cycloinuloheptose, and cycloinuloctose; calyxarenes; and cavitands.

The cyclodextrin and cyclodextrin derivatives useful in the method of the invention are limited only by the solubility of the cyclodextrin and cyclodextrin derivative selected under the particular polymerization conditions. Suitable cyclodextrins useful in the method of the present invention include, but are not limited to, a-cyclodextrin, b-cyclodextrin and g-cyclodextrin. Suitable cyclodextrin derivatives useful in the method of the present invention include, but are not limited to, the methyl, triacetyl hydroxypropyl and hydroxyethyl derivatives of a-cyclodextrin, b-cyclodextrin and g-cyclodextrin. The preferred cylodextrin derivative is methyl-b-cyclodextrin.

The cyclic oligosaccharides having a hydrophobic cavity, such as cycloinulohexose, cycloinuloheptose, useful in the method of the invention are described by Takai et al., Journal of Organic Chemistry, 1994, volume 59, number 11, pages 2967-2975.

The calyxarenes useful in the method of the invention are described in U.S. Pat. No. 4,699,966, International Patent Publication WO 89/08092 and Japanese patent publications 1988/197544 and 1989/007837.

The cavitands useful in the method of the invention are described in Italian patent application no. 22522 A/89 and Moran et al., Journal of the American Chemical Society, volume 184, 1982, pages 5826-5828.

In another aspect of the present invention, emulsion polymers are formed by aqueous free radical polymerization using a macromolecular organic compound having a hydrophobic cavity. When such emulsion polymers are formed by aqueous free radical polymerization and when one or more of the monomers and/or chain transfer agents used in the polymerization has a water solubility at 25-50° C. of no greater than 200 mmol/liter.

The release coating of the present invention includes at least one release agent. Suitable release agents have a weight average molecular weight (Mw) that ranges from 200 to 10,000. All of the weight average molecular weight ranges are inclusive and combinable. The given ranges of molecular weight are believed to permit the release agents to migrate to the film surface during the film formation stage. According to another aspect, the release agent is water dispersible or water miscible. Suitable release agents include, but are not limited to, for example, compounds comprised of long chain hydrocarbons (greater than $C_{10}$), fluorocarbon, silicones, amides, phosphate esters. For example, the release agent may be a surfactant having a hydrocarbon hydrophobe of greater than ten carbons, for instance greater than $C_{10}$.

Varying the amount of the at least one release agent relative to the at least one aqueous multi-lobe emulsion polymer alters the release force of a release coating. Generally, release agents can be added over a broad range of 0.1% to 20%. More specifically, the amount of release agent is dependent on both the chemistry of the release agent(s) as well as the composition of the multi-lobe emulsion polymer. Moreover, optimizing the Tg of the at least one aqueous multi-lobe emulsion polymer relative to the at least one release agent also alters the release force of a release coating. Optimal Tg are without limitation in the ranges from lower limits of 0° C., 15° C., and 25° C. to upper limits of 50° C., 40° C., 35° C. All temperature ranges are inclusive and combinable. Tg can be optimized by several ways, one of which is manipulating the backbone monomer compositions and ratios. In general, the means of altering the release force by adjusting the amount of release agent and by varying Tg are well known by those having skill in the art.

EXAMPLES

Release coatings were prepared from aqueous multi-lobe emulsion polymers having a multimodal particle size distribution and from conventional aqueous emulsion polymers as comparative examples, as summarized in Table 1.

TABLE 1

Polymer compostions used to prepare release coatings

| Example | Polymer Composition | Polymer Morphology | Release Additive | High Speed Adhesion to Backing (HSATB) X Increase after aging (ranges) | Strike through | High Shear Viscosity at 38% solids, 100000, $S^{-1}$ Cps. Measured by Hecules |
|---|---|---|---|---|---|---|
| 1 | 51.9BA/46.8MMA/1.3 AA | Multi-lobe | Aersol 22™ | <1 X | None | 15 |
| 2 | 51.9BA/46.8MMA/1.3 AA | Bimodal/Multi-lobe | Aersol 22™ | 2-3 X | Slight | 13 |
| 3 | 51.9BA/46.8MMA/1.3 AA | Bimodal/Spherical | Aersol 22™ | 2-3 X | Some | 7 |
| 4. Rhoplex ® R-308 | Commercial | Spherical | | 3-4 X | Some | Not tested |

TABLE 2

Tg impact on release
Polymer compostions used to prepare release coatings

| Example | Polymer Composition | Polymer Morphology | Release Additive | Tg, °C. | Release |
|---|---|---|---|---|---|
| 1 | 51.9BA/46.8MMA/1.3 AA | Multi-lobe | Aersol 22™ | 15 | Loose |
| 2 | 41.7BA/57.0MMA/1.3 AA | Multi-lobe | Aersol 22™ | 25 | Medium |
| 3 | 37.8BA/60.9MMA/1.3 AA | Multi-lobe | Aersol 22™ | 35 | Tight |

Examples 1-4 were Tested as Follows:

Samples with 4.9% of the release additive Aersol 22™, commercially available from Cytec Industries Inc., were formulated into a polymer emulsion (solids on solids) and then the release coats prepared from Examples 1-4 were applied to the smooth side of the crepe backing (0.20m×0.25 m), using wire wound rod (WWR) # 0-5 to achieve coat weights between 6-8 g/m². The proper selection of the WWR # depended on solids content, rheology and crepe porosity for samples 1-4. The coated samples were placed in an oven for 30 seconds or 60 seconds @ 130° C.-190° C. (depending on the release chemistry). After drying, all samples were placed in CTR, controlled temperature room at 22° C. and 50% relative humidity, prior to testing. Duplicate samples were placed for a minimum of 24 hrs and a maximum of 1 week at 65° C. and 60-80% relative humidity.

In addition to standard release testing, samples were evaluated for strike-through, which is a qualitative measurement to the degree of bleed through for samples applied at low viscosity and solids. Typically, during the actual release coating application the coating experiences both shear and pressure. The combined shear and pressure during the coating, especially when the coating solids are reduced, causes the release coating to penetrate into the substrates, resulting in inconsistent coverage and therefore inconsistent unwind.

For testing release properties, 5 cm by 15 cm release coated samples were secured to a steel panel using double face tape. Any source of contamination from contacting the coated release was avoided. Approximately ten centimeters of the desired adhesive coated tape were applied to the release coating and pressed with a 2 kg rubber roller by rolling once in each direction. A minimum of 4 panels were prepared for each test, two panels for initial and two panels for aging. The strips were attached to ChemInstruments' AR1000 high speed release tester, and each specimen was peeled at rate of 0.3 meter/second. Force/unit width was measured and compared before and after aging. Data were tabulated and percent increase was calculated and the results of which are shown in Table 1.

What is claimed is:

1. A release coating comprising:
    i) at least one aqueous multi-lobe emulsion polymer; and
    ii) at least one release agent.
2. A method of making a coated product comprising:
    i) applying the release coating of claim 1 onto a substrate to form a coated product; and
    ii) drying the coated product.
3. A method of altering the release force of a release coating comprising the steps of: (a) providing at least one aqueous multi-lobe emulsion polymer; and (b) varying the amount of at least one release agent relative to the amount of the at least one aqueous multi-lobe emulsion polymer.
4. A method of altering the release force of a release coating comprising the steps of: (a) providing at least one aqueous multi-lobe emulsion polymer and at least one release agent wherein the release agent is provided in the range of 0.1-20%; and (b) varying the Tg of the at least one aqueous multi-lobe emulsion polymer.
5. The method of claim 4 wherein the Tg is in the range of 0° C. to 50° C.
6. The method of claim 4 wherein the Tg is in the range of 25° C. to 35° C.
7. The method of claim 4 wherein the particle size distribution of the at least one aqueous multi-lobe emulsion polymer is in the range of 50 nm to 10000 nm.
8. The method of claim 4 wherein the particle size distribution of the at least one aqueous multi-lobe emulsion polymer is in the range of 100 nm to 1000 nm.
9. The method of claim 4 wherein the release agent comprises a surfactant.
10. The method of claim 9 wherein the surfactant comprises a hydrocarbon hydrophobe of greater than ten carbons.

* * * * *